United States Patent [19]
Kratzer

[11] 3,755,816
[45] Aug. 28, 1973

[54] RADIO NAVIGATION SYSTEM
[75] Inventor: Dale L. Kratzer, Trevose, Pa.
[73] Assignee: All Systems, Moorestown, N.J.
[22] Filed: May 1, 1970
[21] Appl. No.: 33,748

[52] U.S. Cl.......................... 343/112 D, 343/100 ST
[51] Int. Cl............................................. G01s 11/00
[58] Field of Search.................. 343/100 CL, 112 D, 343/12, 14

[56] References Cited
UNITED STATES PATENTS

| | | | |
|---|---|---|---|
| 3,242,487 | 3/1966 | Hammack | 343/12 R |
| 2,461,452 | 8/1969 | Welter | 343/12 R |
| 3,518,415 | 6/1970 | Gutleher | 343/100 CL |
| 3,508,828 | 4/1970 | Froome et al. | 343/14 |
| 3,149,330 | 9/1964 | Fiocco | 343/14 |
| 3,380,056 | 4/1968 | Adams et al. | 343/100 CL |
| 3,522,992 | 8/1970 | Jaffe | 343/14 |

Primary Examiner—Benjamin A. Borchelt
Assistant Examiner—Richard E. Berger
Attorney—Morton C. Jacobs

[57] ABSTRACT

The modulation of a radio signal transmitted from a satellite is correlated with a similar waveform generated by a stable oscillator at the receiver. The phase of the latter is varied in a direction to correlate it with the transmitted modulation, and a change in phase is used as a measure of the distance travelled by the transmitted signal. If the transmitted carrier is momentarily not received, the phase of the receiver waveform is not changed until communication is restored, and thereupon phase lock is restored and the phase change determined for the distance measurement.

21 Claims, 5 Drawing Figures

INVENTOR.
Dale L. Kratzer

RADIO NAVIGATION SYSTEM

BACKGROUND OF THE INVENTION

This invention relates to radio navigation systems for facilitating the navigation of a mobile craft with respect to a reference transmitting station.

Long range radio navigation systems for determining the position of a mobile craft (such as a ship at sea or an aircraft) have employed radio transmitters at reference locations and radio receivers on the mobile craft. Such systems have been based on the principle that the time delay of travel of the radio signal from a transmitter to a receiver varies with the distance between them, and the change in phase of the radio signal in its travel affords a measure of the distance of the craft from the reference transmitter station. This phase displacement can be determined by a comparison of the phase of a reference signal at the receiver with that of the received radio signal. Radio navigation systems of this type are described in U. S. Pat. Nos. 2,855,595, 2,975,417, and 3,254,341.

During use of such systems, there may be a momentary loss of the transmitted signal. Failure of communication and signal fading may occur with various atmospheric and radio conditions (e.g., signal cancellation due to multipath reflections off water or ice), and due to relative movement of the transmitter and receiver the transmitted signal may be shielded from the craft. One instance of signal interruption with shielding arises with the use of a satellite transponder for relaying the transmitted signal; a tumbling or spinning satellite results in repeated loss of the radio signal. Under these circumstances, it is important that there be no loss of information due to phase displacement or range, and that the restoration of the transmitted signal result in an accurate and rapid response of the receiver. Where the navigation receiver operates to lock on to a carrier signal and there is repeated loss of the carrier (e.g., due to a tumbling satellite), there tends to be ambiguity in the particular frequency which the receiver locks on and a slow receiver response.

Such a navigation receiver should be suitable to handle communication signals simultaneously transmitted with the navigation signal, and preferably should be usable with various types of signals including phase shift keying, pseudo-random code, and suppressed carrier double sideband modulation. An optimum discrimination against noise is also desirable. The receiver should be operable with a synchronous satellite at L-band (1540–1660 mHz), which band has superior propagation characteristics and higher accuracies than lower frequencies for navigation.

SUMMARY OF THE INVENTION

It is among the objects of this invention to provide a new and improved radio navigation receiver.

Another object is to provide a new and improved radio navigation receiver which operates effectively when transmission or reception of the radio signal is momentarily interrupted.

Another object is to provide a new and improved radio navigation receiver that operates accurately and reliably.

In accordance with one embodiment of this invention, a radio navigation receiver for use with a synchronous transmitting satellite operates to correlate a local reference clock with the modulation of the transmitted signal. The modulation and the local clock are digital signals of the same type, with the phase of the local clock being adjustable to correlate with that of the received modulation. When the phase of the local clock does not correlate with the received modulation, an error signal is developed to change the phase of the reference signal in a direction to place it in correlation with that of the received modulation. Also a ranging computer is operated to develop measurement signals representative of the change in phase. When the local reference clock is in phase with the received signal, it is locked on and the ranging measurement remains unchanged until a phase displacement develops again.

For purposes of the correlation, two signal channels are provided, one of which carries the autocorrelation function of the modulation waveform referred to a local reference modulation, and the other the autocorrelation function of the modulation referred to the local modulation in phase quadrature. The channel signals are generally in the form of a modulated carrier, and they are correlated one with the other to develop an error signal which is used to control the phases of the local modulations that are supplied to the two signal channels. In the condition of phase correlation (or phase-lock) in the reference channel, the modulation is cancelled and the net signal is the carrier. In the quadrature channel at phase-lock, the carrier is neutralized in the resultant signal, and only two side bands of the transmitted and quadrature modulations remain. When the carrier signal disappears from the quadrature channel, the correlation error signal is effectively zero, the local modulation remains unchanged and is effectively phase-locked to the transmitted modulation; the ranging information also remains unchanged. When out of phase-lock, the error signal is effective to move the phase of the local modulation in a direction to restore the phase-lock condition. Ranging information is developed as a measure of the phase change to obtain the new range of the mobile craft. If the radio signal should be interrupted in its transmission or otherwise lost, the absence of carrier signal in the signal channels corresponds to the condition of phase lock, so that the correlation error signal is such as to maintain the phase of the local modulation and the ranging information at the time of signal interruption. When transmission is restored, the correlation error signal is such as to change the phase of the reference clock in the manner described above, which develops the range information corresponding to the then existing phase displacement.

BRIEF DESCRIPTION OF THE DRAWING

The foregoing and other objects of this invention, the various features thereof, as well as the invention itself, may be more fully understood from the following description when read together with the accompanying drawing, in which.

In the drawing, corresponding parts are referenced throughout by similar numerals.

DESCRIPTION OF A PREFERRED EMBODIMENT

Figure 1:
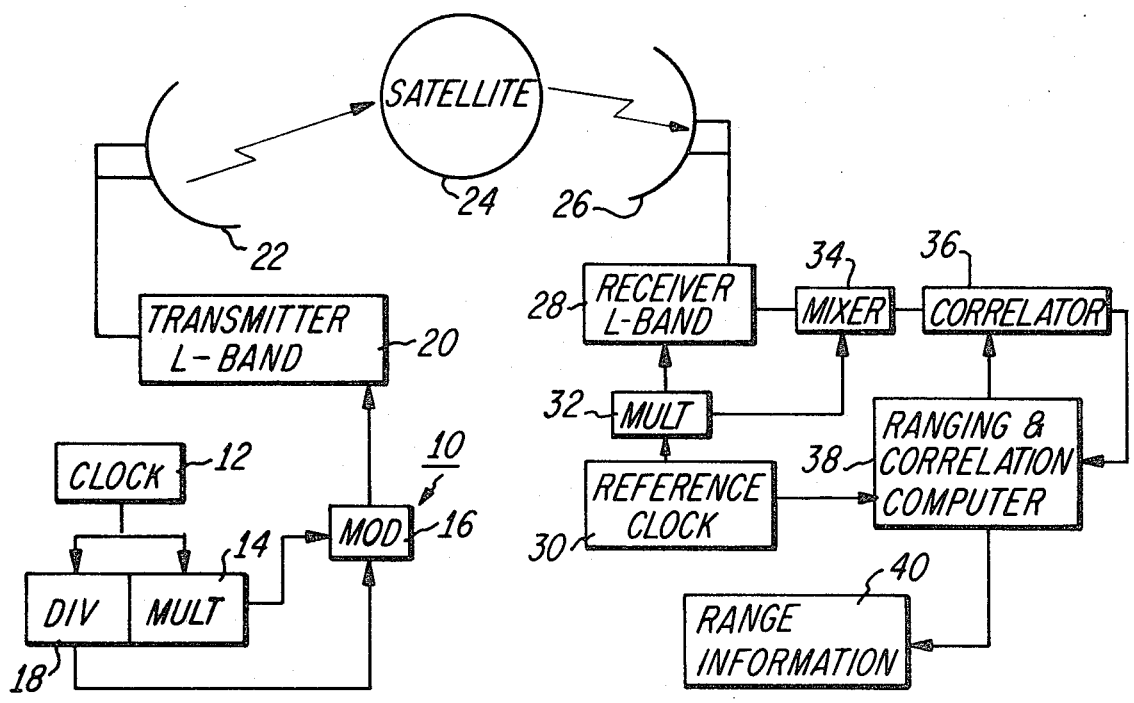
FIG. 1 is a schematic block diagram of a radio navigation system embodying this invention.

The transmitter section 10 of the system consists of a frequency standard 12 which develops a clock signal whose frequency (e.g. 5 mHz) is multiplied in a frequency multiplier 14 to an intermediate frequency $i-f$ (e.g., 70 mHz), which is supplied to a modulator 16 for modulation by a lower frequency signal developed from the clock by a frequency divider 18. The divider supplies ranging tones at various frequencies corresponding to suitable lane widths in which a mobile craft will be located. For example, for 1-mile lane widths, a ranging tone of 83.3 kHz; for 10-mile lane widths, a tone of 8.33 kHz, and for 100-mile lane widths, a tone of 0.833 kHz. The modulated $i-f$ is heterodyned in a transmitter 20 to L-band frequencies for transmission by way of the antenna 22 to a satellite 24.

The transponded signal from the satellite 24 is received at the antenna 26 of a receiver 28 on a mobile craft (such as a ship at sea or an aircraft). This front end section 28 amplifies the transmitted signal and heterodynes it by means of a suitable mixer to an $i-f$ frequency (e.g., 70 mHz) by means of a reference clock signal from clock 30 similar to transmitter clock 12 multiplied in frequency by a multiplier 32. The 70 mHz signal is amplified and supplied via a band-pass filter in section 28 to a second mixer 34, which receives a heterodyning signal at 4 mHz from the multiplier 32 for developing the $i-f$ signal that is supplied to a correlator 36 and thence to correlation computer 38. The reference clock square waves from clock 30 have their phase modified by a correlation computer 38, and supplied as signals for autocorrelation with the modulation of the $i-f$ signal in the correlator 36. When the signals are correlated, the output of correlator 36 is effectively a zero-error signal, and the loop is maintained in its phase-locked condition. However, due to relative movement between the mobile craft and the satellite, the modulation of the $i-f$ signal moves out of phase with respect to the control signals supplied from the computer 38. The correlator output is in a direction to restore the phase-lock relationship, and the computer effectively measures the phase change that is needed for restoring phase lock, and thereby develops ranging information which is supplied to an output 40.

Figure 2:
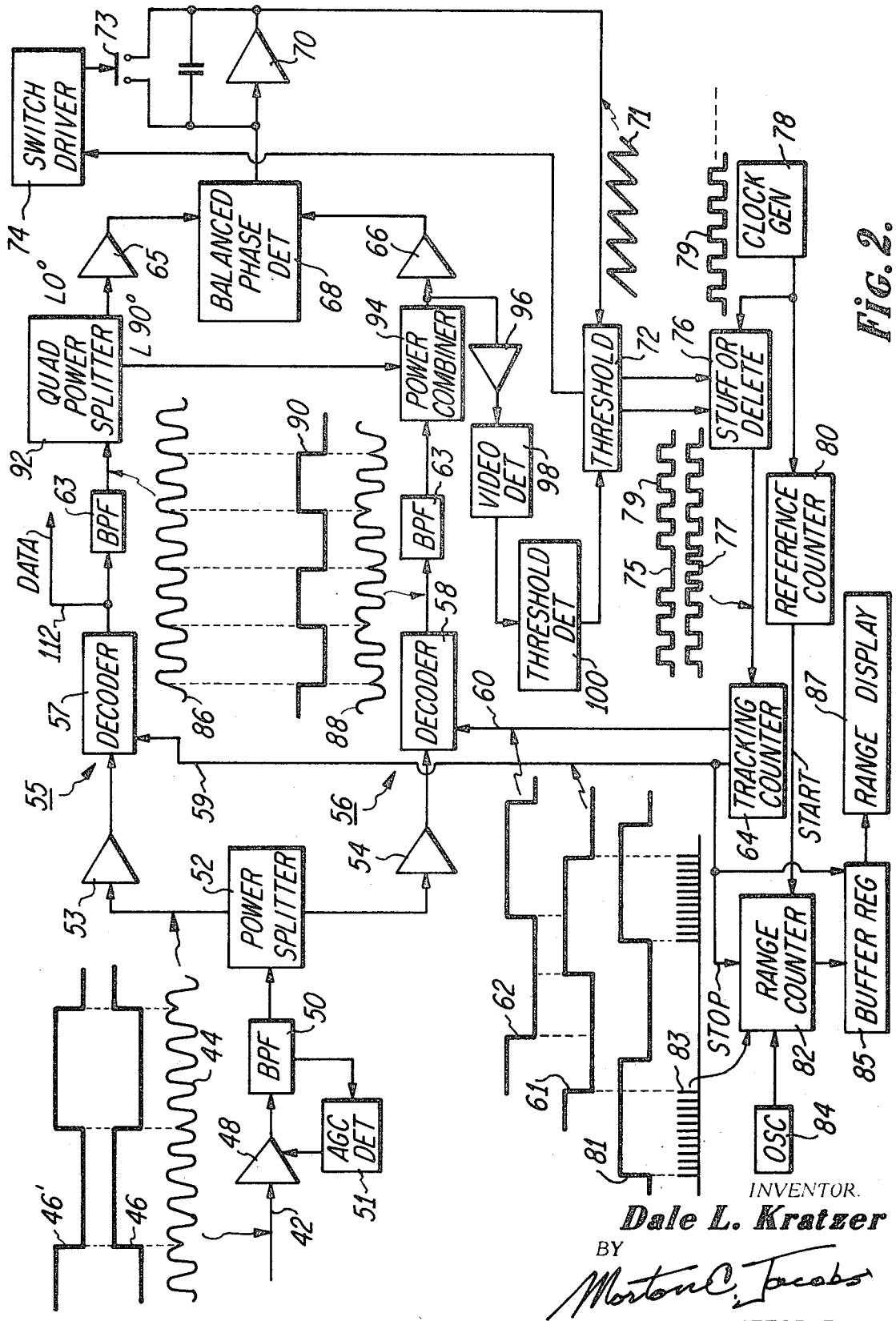
FIG. 2 is a schematic block diagram of a radio navigation receiver employed in the system of FIG. 1.

In FIG. 2, the correlator and computer are illustrated in block diagram form. The output of the mixer 34 on line 42 is the $i-f$ signal 44 that contains the transmitted modulation 46 or 46'. This modulation is a square wave that assumes either of two forms 46 and 46' having opposite phases. This $i-f$ signal is amplified in an amplifier 48, the output of whch is filtered in a band-pass filter 50 and supplied to a power splitter 52. The output of the filter 50 is also returned via AGC detector 51 in an automatic gain control loop to the amplifier 48. The AGC loop establishes the gain of the system at the input to the power splitter 52, fixes the noise power at a constant level, and generally provides an accurate reference for the correlation.

The power splitter 52 supplies the modulated $i-f$ signal via separate buffer amplifiers 53 and 54 to two separate signal channels 55 and 56. The modulated $i-f$ is supplied to separate decoders 57 and 58, which also receive locally developed modulation signals on lines 59 and 60. These modulation signals are a reference square wave clock 61 on line 59 and a square wave clock 62 in quadrature with the wave 61 on line 60. These signals are developed in a tracking counter 64, and but for the phase of these signals, they are the same signal function as the modulation of the received radio signal and of the $i-f$ supplied to the decoders 57 and 58.

The outputs of the decoders are the cross-products of their inputs and are supplied via separate band-pass filters 63 and limiting amplifiers 65 and 66 to a balanced detector 68. The output of the latter is supplied to an integrator 70, which develops a direct voltage output (e.g., a sawtooth wave 71) which is supplied to a threshold circuit 72. The threshold circuit 72 operates to activate a circuit 74 for driving an integrator discharge switch 75 connected across the integrator 70 when a certain threshold voltage is reached. Thus, the sawtooth 71 is repeatedly generated at a variable rate.

The threshold circuit 72 also supplies control signals for a clock-pulse control circuit 76 which controls the passage of clock pulses 79 from the generator 78 to the tracking counter 64. The clock-pulse rate is chosen to provide a predetermined count of pulses (e.g., 60) over the period $T_0$ of the modulation wave 46. When the amplitude of the integrator's sawtooth, in absolute value, is less than the pre-set threshold of circuit 72, the control signals supplied by the latter to circuit 76 effectively opens the latter for the passage of a continuous train of clock pulses to the tracking counter 64, so that the latter repeatedly counts through its normal count cycle. When the threshold voltage is reached, the circuit 76 is operated in one fashion or the other depending upon the polarity of that voltage; that is, for one polarity the circuit 76 operates to add an additional clock pulse to the cycle count of tracking counter 64. The additional clock pulse is generated by momentarily converting the clock pulses to pulses 77 of half the width and twice the rate and supplying a pair of such pulses to counter 64 at the beginning and ending of a clock pulse 79 and in place thereof. For the opposite polarity, the circuit 76 deletes (closes a gate to block the passage of) such a pulse from the cycle count, as indicated at gap 75 in the clock pulse train.

The clock pulses 79 from freely running generator 78 are also supplied to a reference counter 80, which recycles continuously and operates generally in synchronism with the tracking counter 64 (except for the stuffing or deleting of pulses produced by the action of circuit 76). The output of reference counter 80 (the positive-going step) is used as a START signal 81 for operating a range counter 82, which also receives a STOP signal 61 (either positive or negative-going step) from the reference channel output 59 of tracking counter 64. The range counter 82 operates to count successive pulses 83 supplied by a freely running crystal oscillator 84 during the time interval between each START signal 81 and the following STOP. This time interval serves as a measure of the range.

Figure 3:
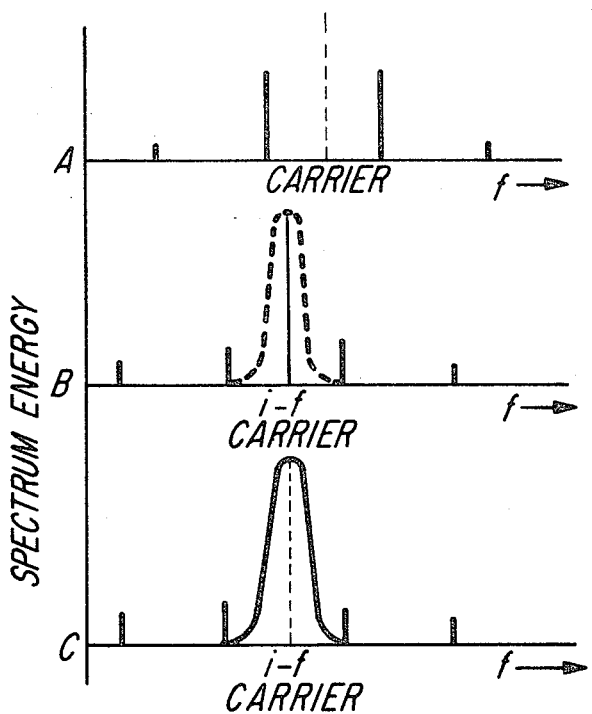
FIG. 3 is an idealized graphical diagram of the spectra of signals occurring in various portions of the receiver of FIG. 2.

The operation of the receiver of FIG. 2 is explained in connection with phase shift keying modulation. The modulation is binary, either 0° or 180°, as indicated by the waveforms 46 and 46' (FIG. 2). This symmetrical modulation places all of the range tone energy in the sidebands for optimum modulation and efficient operation under marginal reception conditions. FIG. 3A graphically represents the frequency spectrum of the transmitted waveform, with the central broken lines indicating the absence of power at the carrier frequency and the other, full lines indicating the sideband power. The modulation is preferably square wave as indicated, but it may also take other forms, such as sinusoidal. The modulated $i$-$f$ 44 is the signal waveform supplied to the decoders 57 and 58, and it differs from the transmitted waveform only in the phase displacement of the modulation; in all other material respects the modulated $i$-$f$ is the same as the transmitted signal.

The operation is first considered in the condition of phase lock, which is the operating condition of zero-error signal about which the system normally operates. In this condition, the local reference modulation 61 is the reverse of the modulation 46 of the $i$-$f$ signal 44 supplied to decoder 57. The transmitted and local modulations are equal and opposite and therefore neutralized in the condition of phase lock, and the output of decoder 57 and filter 63 is the carrier signal 86 at $i$-$f$. This output 86 of filter 63 (the magnitude of the carrier sine wave), which is the autocorrelation function of the modulation waveform in the reference channel 55 at phase lock, has all of the modulation removed and its spectrum (FIG. 3B) is the single $i$-$f$ carrier frequency. In the quadrature channel 56, the modulated $i$-$f$ is multiplied by the quadrature control signal 62 in decoder 58, and its output 88 (at phase lock) is the carrier at $i$-$f$ with equal positive and negative modulated sections produced by the combined modulation 90 of the received and quadrature modulations 46 and 62. The $i$-$f$ carrier power is effectively zero in that condition, and the resultant signal has a spectrum (FIG. 3C) in sidebands only which are rejected by the filter 63. The signal passed to detector 68 by filter 63, the autocorrelation function of the modulation waveform in the quadrature channel 56, is effectively zero or a very low power sinusoidal signal at phase lock. Under these conditions, the output of the balanced detector 68 (which autocorrelates the modulated carriers in the two channels) is effectively zero; and, in the absence of a substantial error signal, the tracking counter 64 repeats its count cycle without change and maintains unchanged the phases of the control waveforms 61 and 62 at its outputs. Thus, there is no change in the outputs of the decoders 57 and 58 so long as the phase of the received signal modulation remains unchanged. The $i$-$f$ stages are wide-band circuits capable of timing accuracy which is important for the correlation of the modulation.

When the output of the balanced detector 68 is substantially zero, the sawtooth 71 changes very slowly (e.g., due to the noise level) and does not reach the threshold of circuit 72 for a relatively long period. During that period the stuff and delete circuit 76 remains open to pass the clock pulses 79 from generator 78 to tracking counter 64 synchronously with their passage to reference counter 80; the same number of pulses are supplied to both. Under those circumstances, the STOP signal 61 remains unchanged in its phase, and the phase difference between it and the constant-phase START signal 81 also continues unchanged. Thus, the range counter 82 remains open to pulses 83 from oscillator 84 for the same time interval, and the range information remains unchanged in this condition of phase lock. Each STOP signal 61 initiates transfer of the range count to buffer register 85, which activates display 87; this read-out does not change in phase lock. The feedback control loop neutralizes any changes in the tracking and range counters produced by noise signals. The digital techniques in the tracking and range counters ensure stable holding of the range measurements during losses and interruptions of the transmitted signal.

When the craft moves toward or away from the satellite from some known starting point, the phase of the received modulation changes, as do the phase relations with control signals 61 and 62, and the phase-lock condition no longer exists. Both signal channels 55 and 56 carry modulated $i$-$f$, and in the quadrature channel 56, the positive and negative sections of the modulation are no longer equal, so that there is a resultant signal of modulated carrier which is passed by filter 63. Thus, there is an increase in the carrier power passed by the quadrature channel 56 and a decrease in that passed by the reference channel, and the product of the two increases, and the output of the balanced detector 68 is a direct voltage representative of that condition. Under those circumstances, the integrator 70 output varies along the slope of sawtooth 71, which at a particular threshold operates circuit 72 momentarily, which operation is effective to operate shorting switch 76 to discharge integrator 70 and complete a sawtooth cycle. This operation of the threshold circuit 72 (which, as explained below, provides an output of either of opposite polarity signals) is also effective to either close the stuff and delete circuit 76 momentarily during the count cycle of clock pulses to delete one such pulse in its transmission to the tracking counter, or alternatively, to add a pulse within the cycle so that an additional such pulse is transmitted to the counter 64. Where a pulse is deleted from the tracking counter cycle, it has the effect of advancing the leading edge of the control signal 61 (and correspondingly of the quadrature control signals 62), and where the pulse is added, of retarding it. In the case where there is a retarding of the time occurrence of the STOP signal 61 with respect to the START signal 81, range counter 82 is opened a longer time for pulses 83 from crystal oscillator 84, which increases the range count. In the opposite set of circumstances, the range count decreases since there is a decrease in the phase difference between STOP signal 81 and the START pulse from reference counter 80. If the transmitted signal is interrupted, a substantial change in range may occur but the digital tracking is not changed; upon restoration of the signal, the digital tracking is restored and assures rapid restoration of the phase-lock and updating of the range count to indicate the accumulated phase change from the starting point.

Figure 4:
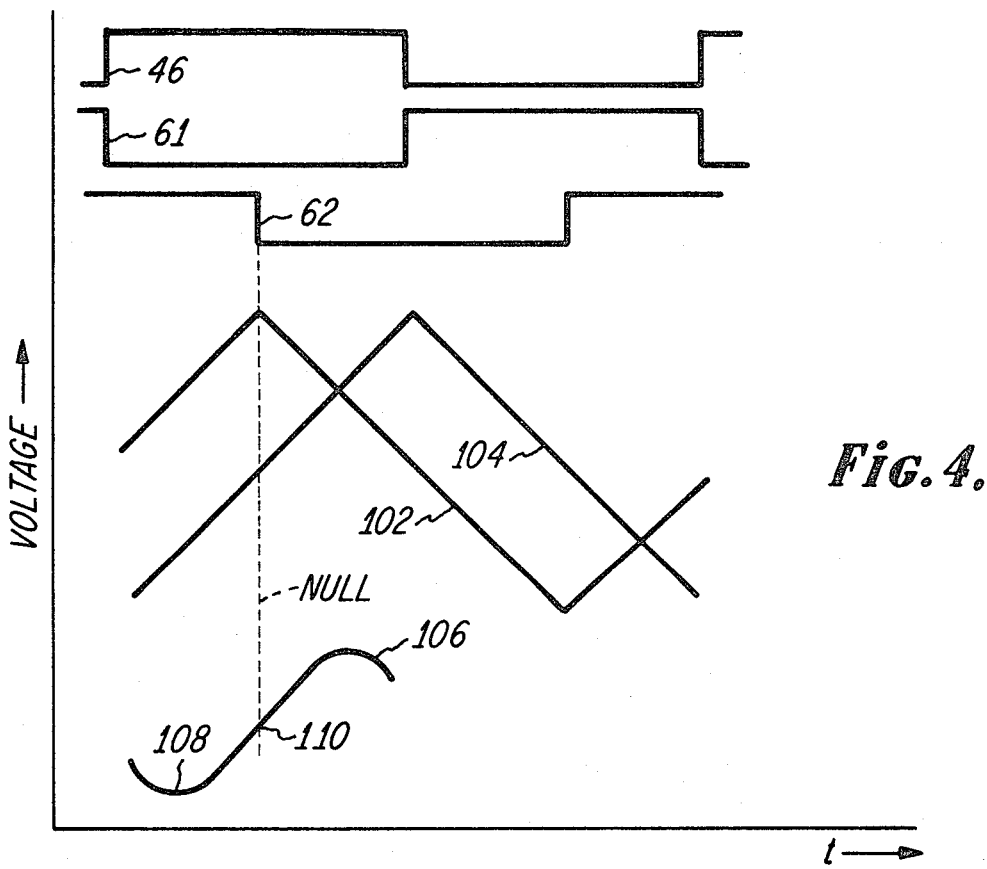
FIG. 4 is an idealized graphical diagram of signal functions occurring in portions of the receiver of FIG. 2.

The correlating action is indicated in the graphical diagram of FIG. 4. The phase relations of the transmitted modulation 46 and the local modulations 61 and 62 are indicated, as well as the corresponding correlation functions 102 and 104, or signal amplitudes respectively produced by the decoders 57 and 58. The output of the balanced detector which correlates signals in the two channels 55 and 56 is either of two parabolas 106 and 108 of opposite polarities, which have adjacent legs connected by a linear section at the center of which is the zero-error operating point 110. As the relative phases of the transmitted modulation 46 and the local modulation 61 change from the indicated null condition, the correlation functions move to the right or to the left, so that the balanced detector output is on the positive or the negative parabola. This change results corrrespondingly in the sawtooth 71 being positive or negative-going, so that the feedback loop modifies the phase of the control signals 61 and 62 to restore them to the proper phase relation with the transmitted modulation 46, corresponding to that of the zero-error operating point indicated in FIG. 4.

Figure 5:
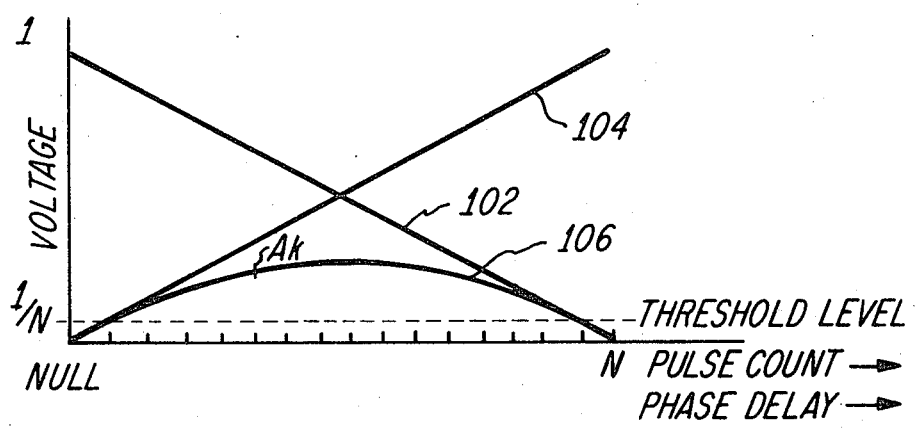
FIG. 5 is an idealized graphical diagram used in the explanation of the operation of the receiver of FIG. 2.

The restoration action, in its relation to the autocorrelation functions 102 and 104, is indicated in FIG. 5, which incorporates a portion of the graph of FIG. 4. It is assumed that the phase of the transmitted modulation 46 differs from the local modulation 61 by a number of time units corresponding to a position K units (indicated along the X-axis) from the null or zero-error position in a cycle of N units of the tracking counter. This condition gives rise to a detector output at the point $A_K$ which is greater than the threshold level of circuit 72, which threshold is set at a value of 1/N of the maximum value of the autocorrelation functions. When the sawtooth 71 reaches that threshold value, the phase of the local modulation is stepped to the position K-1 and the sawtooth 71 is terminated with discharge of the integrator 70. This cycle of operations is repeated and the phase successively stepped, until the phase of the local modulation is restored to the null or zero-error operating point. The threshold 1/N is set at a sufficiently high level so that noise signals are generally not effective to exceed the threshold and modify the range measurement.

The two signal channels 55 and 56 have a coordinated operation through the correlating operation of the phase detector 68 and integrator 70. That is, the two channels carry autocorrelation functions which tend to be relatively displaced (due to the displaced phases of the local modulations) with movement away from and toward the null operating position. However, the relative displacement remains unchanged since the signal spectra tend to move together. If the signal in one channel has a frequency change (e.g., due to doppler shift), the other channel's signal has the same change. Thus the ultimate control operation of restoring the null or phase-lock condition, and of measuring the change in phase of the local modulation required to produce that condition (which is the range measurement), is not affected by frequency variations. The term "correlate" is used herein in the statistical sense and that used in radio signaling of determining the degree of association or agreement of two signal trains by multiplying corresponding elements and averaging the products. Thus, the correlation techniques used herein determine the phase match of the local modulation 61 to the received modulation 46. It also matches the signal functions in the channels 55 and 56. The correlation ensures a maximum signal-to-noise ratio, for when the modulation 46 is neutralized at phase-lock in the reference channel, only the single frequency of the $i-f$ remains. With that single carrier frequency defining the null operating condition of phase-lock, the channel acts as a narrow filter, and the correlation processing constitutes a matched filter for the modulation and optimizes the signal-to-noise ratio. By means of the correlation techniques, any doppler shift (e.g., 10–30 Hz) of the carrier, as noted above, is prevented from impairing range measurements. Moreover, with the correlation and phase-lock performed on the modulation signal, which is frequency stable (in contrast to the carrier), the separate correlating operation performed in each channel is also frequency stable.

The receiver is provided with additional measures to detect the loss of transmission of the navigation signal and to prevent mis-operation of the range measuring equipment (e.g., due to noise which would tend to cause jitter of the range measurement). A quadrature power splitter 92 in signal channel 55, between the band-pass filter 63 and amplifier 65, supplies a portion of that channel's signal to channel 56 by means of a power combiner 94. This signal is brought in to normalize the signals in the two channels and ensure uniform amplifier gain. The two channels 55 and 56 are constructed (e.g., by the insertion of appropriate attenuator pads) to provide uniform signal levels in the two channels. A portion of the output of the combiner 94, by means of a power splitter (not shown), is taken off, and by means of an amplifier 96 supplied to a video detector 98. The output of the latter is supplied to a threshold detector circuit 100, which in turn supplies a control signal to threshold circuit 72. In operation, the output of power combiner 94, during normal operation, always contains a carrier signal section, since there is such a signal in either or both of the channels. Under those conditions, the output of detector 98 is of sufficient amplitude to operate the threshold circuit 100 to produce a control signal, enabling threshold circuit 72 to operate in its normal fashion. However, when there is an interruption in the transmitted signal, or if its level due to fading is so low that the signal in both channels is essentially null, the output of detector 98 is insufficient to operate the threshold circuit 100, and the threshold circuit 72 is disabled so that its output is the normal control signal occurring at phase-lock. Consequently, the stuff or delete circuit 76 remains open, so that tracking counter 64 continues to maintain the existing phase of its control signals 61 and 62 and the range counter 82 remains unchanged.

This invention may be used to transmit and receive communication signals together with navigation signals without degrading performance of either function. The communication signal may take the form of similar square-wave modulation, but at a substantially lower frequency. A data channel 112 may be connected to receive the output of decoder 57 (via a power splitter, not shown), which output always contains the received carrier and any communication data modulation. In addition, doppler measurements may be made by tapping the output of the power combiner 94 from amplifier 96 (via a power splitter, not shown). This combined output contains the carrier, which is present in one or the other of the signal channels, and is suitable for measuring doppler.

The nature of the signals and their magnitudes in the correlation system may be analyzed as follows (noise terms are omitted for simplicity):

The signal transmitted by the originating station is given by $$T(t) = A f(t) g(t) \cos \omega_o t$$

where $A$ is the amplitude of the transmitted signal, $f(t)$ is the code (square wave) used in the navigation system and $g(t)$ is the communication signal, $\omega_o$ is the carrier radian frequency. Both $f(t)$ and $g(t)$ have values of ± 1 (0° and 180° phase shift keying), $f^2(t) = 1$ and $g^2(t) = 1$. One bit of $g(t)$ is an integral number of code lengths of $f(t)$. The signal received is the transmitted signal transmitted $\tau$ seconds earlier. Hence the signal is a delayed replica with attenuation.

After mixing to an i-f frequency $\omega_2$, the received signal is divided and supplied to the decoders 57, 58 of the correlator. This signal is $$V_1(t) = f(t-\tau) g(t-\tau) \cos(\omega_2 t + \omega_0 \tau).$$

The control signals 61, 62 to the decoders are as follows:

$$V_2(t) = f(t-T) \text{ (reference)}$$

and $$V_3(t) = f(t-T + T_0/4) \text{ (quadrature)}$$

where $T_0$ is the duration of the square wave. These signals take on ± values and multiply the decoder input signals respectively. The decoder outputs are hence $$V_4(t) = f(t-\tau) f(t-T) g(t-\tau) \cos(\omega_2 t + \omega_0 \tau) \; V_5(t) = f(t-\tau) f(t-T + T_0/4) g(t-\tau) \cos(\omega_2 t + \omega_0 \tau)$$

After filtering these signals become $$V_6(t) = \overline{f(t-\tau) f(t-T)} \, g(t-\tau) \cos(\omega_2 t + \omega_0 \tau)$$

and $V_7(t) = \overline{f(t-\tau) f(t-T + T_0/4)} \, g(t-\tau) \cos(\omega_2 t + (t-\omega_0 \tau)$
where the bar above terms represents averaging for the rise time of the filter.

Signals and noises are introduced to the phase detector which multiplies the two inputs; neglecting amplification factors, its output is the product of the decoder outputs:

$$V_8(t) = \overline{f(t-\tau) f(t-T)} \, g(t-\tau) \cos(\omega_2 t + \omega_0 \tau) \times \overline{f(t-\tau) f(t-T + T_0/4)} \, g(t-\tau) \cos(\omega_2 t + \omega_0 \tau)$$

The integrator 70 averages this signal, and the average over one interval of a repeated function is equivalent to the average over all time. Hence the integrator output is:

$$V_8(t) = R(\tau - T) R(\tau - T + T_0/4)$$

where $$R R(\tau - T) = \overline{f(t-\tau) f(t-T)}$$

and $$R(\tau - T + T_0/4 = \overline{f(t-\tau) f(t-T + T_0/4)}$$

$$R(0) = 1 \text{ and } R(T_0/4) = 0$$

at phase lock, when $$\tau = T, R(\tau - T) \approx 1$$

and $$F(\tau - T + T_0/4) = 4(\tau - T/T_0).$$

Hence the integrator output near phase lock is approximately $$V_8(t) \approx 4(\tau - T/T_0) + \text{Noise Terms (where the noise is that of the narrow bandwidth of the system).}$$

The threshold circuit receives the signal, 4 ([$\tau - T$]-/$T_0$) + noise, and initiates a phase advance for $\tau > T$, to retard the digital circuitry for $\tau < T$, or to do nothing when the signal is less than threshold due to $\tau = T$ or the signal level is too low.

From the above description, it is seen that the navigation receiver of this invention receives modulated navigation signals and correlates them with similar waveforms generated from a stable oscillator in the receiver. The modulation is preferably square-wave phase sihft keying (with pseudo-random coding) to provide suppressed carrier double side-band transmission. This correlation technique provides an optimum for discriminating against white noise. Two signal channels are provided. One is designed to correlate local modulation in phase with the received modulation, and the other channel is designed to have the local modulation in quadrature with received modulation. The signals in the two channels are correlated against each other to develop driving signals for modifying the local modulation to match with the received modulation. The phase of the local modulation square wave is moved in steps by modifying a normal pulse-count cycle in a tracking counter; that is, pulses are added to or deleted from a pulse train supplied by a stable clock. The phase of the local modulation to be correlated is determined by the time of a certain signal pulse in the count cycle. This time is either retarded or advanced from its previous position by the modification of the pulse-count cycle. The difference between a normal and modified pulse-count cycle is a measure of change in range as well as in phase; the accumulation of such pulse-count differences establishes the range from a base line i.e. from any known starting point. The base line is defined by the waveform from a continuously recycling reference counter. The phase difference between the waveforms from the tracking and reference counters is a measure of the range at any instant; a read-out of that range is obtained by a pulse count over the time interval corresponding to that phase difference in counter waveforms.

The above-described embodiment is illustrative of one form of the invention and is presented by way of example. Other forms of the invention and modifications thereof will be apparent to those skilled in the art from the above description, as will various circuits known in the art which may be used in the above described system. For example, the front end receiver circuits (e.g., the mixer and AGC) may be of any suitable conventional form. The gain of the AGC is such as to provide a constant noise level at the power splitter, in order to set the threshold level of circuit 72 for a suitable signal-to-noise ratio. The decoder circuits 57 and 58 are phase modulators which are preferably the same as the modulator 16 used in the transmitter 10. A suitable decoder circuit that has been used is one known as a double-balanced mixer, a broad-band circuit which is effective to eliminate the modulation of the i-f signal 86 in the reference channel 55 under the conditions of phase lock. The filters 63 should preferably pass only the central frequency of the i-f carrier and its modulation, and narrow-band filters that are highly selective have been used to eliminate side-band frequencies. For high precision, the amplitude response is important, and it has been found desirable to match these two filters to within 8° of relative phase shift. Similarly, the limit amplifiers 65 and 66 for high precision should be matched in phase to within 2°. The switch 75 for discharging the integrator 70 is preferably electronic, and a field-effect transistor has been found suitable for this purpose.

The clock generator 78 may supply pulses at a high repetition rate (e.g., 5 mHz has been found suitable). The stepping of the phase of the control or STOP signal 61 is varied, depending upon the lane widths and ranging tones that are used. For example, with a ranging tone of 83.3 kHz, for a lane width of almost 1 mile, a count cycle of 60 is used in the reference counter 80. The deletion of one clock pulse by circuit 76 produces a 6° step of the phase of STOP signal 61, where 180° corresponds to a lane width (phase lock at either half-cycle step may be used). Thus this stepping of STOP signal 61 indicates a measurement of movement of the mobile craft of about a couple of hundred feet. A higher precision can be achieved with higher frequencies. At a middle frequency of 8.33 kHz, corresponding to a lane width of about 10 miles, the reference counter is set for a count cycle of 600. Each step of the tracking counter 64 is produced by the addition or deletion of 6 pulses to the clock pulse train, which step corresponds to a phase change of about 3.6° or about 0.2 miles of movement. A coarser measurement is obtained with a ranging tone of 0.833 Hz; a tracking counter step is produced by the insertion or deletion of 60 pulses corresponding to 3.6° of phase change, or 2 miles of craft movement in a lane width of about 100 miles. The pulses 83 supplied to the range counter 82 are also preferably at a megahertz rate for precision in conversion of the phase difference to range.

The digital circuitry may be constructed in any suitable form. Contemporary integrated circuit logic has been found suitable, with decade stages used in the counters and arranged suitably to deal with the particular count cycle. The control signal 61 may be obtained from a terminal of the last stage of counter 64, and the quadrature signal 62 may be obtained from an earlier stage (or by a combination of stages) in any suitable fashion. Where the counter stages employ flip-flops having input gates, the delete circuit 76 effectively incorporates such gates to block the clock pulses 79. The stuffing operation has been achieved by operating a gate to initiate operation of a frequency multiplier which doubles the pulse rate at half its width and the doubled pulse train is supplied in response to, but instead of, clock pulses 79.

Accordingly, a new and improved radio navigation system is provided which operates accurately and reliably, and the receiver of which operates effectively when transmission of the radio signal is momentarily interrupted.

What is claimed is:

1. In a radio navigation receiver for a modulated carrier signal corresponding to a received modulated radio signal transmitted from a reference station; the improvement comprising:
   means for generating a local modulation signal independently of the reference station and for varying the phase thereof;
   means for correlating the phase of the local modulation signal with the phase of the modulation of the carrier signal and for activating said generating means in accordance with the residual power of said carrier signal to vary the phase of said local modulation signal in a direction to correlate with that of the carrier signal,
   and means for deriving a measurement signal in accordance with the amount of variation of said modulation phase as a representation of the transmission time of the radio signal.

2. The improvement in a radio navigation receiver as recited in claim 1, wherein:
   said measurement signal deriving means includes digital means for storing the measurement signal when the radio signal is not received.

3. The improvement in a radio navigation receiver as recited in claim 1, wherein digital storing means is operative for storing said measurement signal when the local modulation signal is correlated with the received signal.

4. A radio ranging receiver for a modulated carrier signal corresponding to a received modulated radio signal transmitted from a reference station;
   said receiver comprising: a plurality of signal channels, means for supplying to said channels signals including the received modulated carrier signal and a local generated modulation signal supplied to said channels in a certain phase difference relation, and separate means in each channel for combining said received and local modulation signals;
   means for relating the combined signals in said channels and for generating a control signal in accordance with the relation of the combined signals in said channels;
   and means responsive to said control signal for modifying the phases of the local modulation signals supplied to said channels and for developing a signal proportional to the amount of phase modification, said means for modifying the local signal phases tending to reduce the difference in phase between the received modulation and the local modulation in one of said channels;
   whereby said phase modification signal is proportional to the transmission time of the radio signal.

5. A radio ranging receiver as recited in claim 4 wherein said means for relating the combined signals and for generating a control signal includes means for detecting the residual carrier power of said combined signals.

6. A radio ranging receiver as recited in claim 5 wherein said means for modifying the signal phases includes means responsive to the existence of substantial residual carrier power in one or the other of said channels for enabling the modifying of the phases of the local signals.

7. A radio ranging receiver as recited in claim 4 wherein each of said combining means includes means for correlating the received and local modulation signals and for producing a modulated carrier signal representative of the correlation; and said means for relating the combined signals and for generating a control signal includes means for correlating the modulated carrier signals in said channels.

8. A radio ranging receiver as recited in claim 7 wherein the local modulation in one of said channels is in quadrature with respect to the other.

9. A radio ranging receiver as recited in claim 8 wherein the received and local modulations are rectangular waves having portions of positive and negative polarities.

10. A radio ranging receiver as recited in claim 4 wherein said means for modifying the signal phases includes means responsive to the existence of combined signals in one or the other of said channels for enabling the modifying of the phases of the local signals.

11. A radio ranging receiver as recited in claim 10 wherein said means for enabling the phase modifying of the local signals includes means for detecting the existence of residual carrier power above a certain level.

12. A radio ranging receiver as recited in claim 11 wherein said phase modifying means includes means for adjusting the local modulation phase in discrete steps.

13. In a radio navigation receiver as recited in claim 1 wherein said generating means includes means for varying said signal phase in discrete steps and for maintaining the phase between said steps of variation; and said means for activating said generating is responsive to a substantial level of carrier signal power.

14. A system for measuring changes in distance of a mobile craft from a remotely located transmitter of a modulated carrier;
said system comprising:
generating a local clock signal and combining the clock signal with the received modulation of a carrier corresponding to the transmitted carrier signal;
detecting the residual carrier power in the combined signal and controlling the phase of the clock signal to adjust it in a direction to place it in a certain phase relation with said received modulation;
measuring the phase change produced by the phase adjustment and accumulating changes in phase to compute the distance traveled by said mobile craft.

15. A measuring system as recited in claim 14, wherein said controlling of the clock signal phase is in response to a substantial level of residual carrier power.

16. A measuring system as recited in claim 15, wherein the controlling of the phase of the clock is by adjustment of discrete steps thereof and by maintaining the phase between adjustments, and wherein the process of said system is repeated until the clock signal is in said certain phase relation with the received modulation.

17. A measuring system as recited in claim 15, wherein said combining of the clock signal with the carrier modulation is separately performed with two phase displaced forms of the clock signal to produce two combined modulated carrier signals; and said carrier power detecting includes the correlating of the combined modulated carrier signals.

18. A measuring system as recited in claim 17, wherein said controlling of the clock signal phase is in response to a substantial level of residual carrier power in one or the other of said combined modulated carrier signals.

19. A measuring system as recited in claim 14, and further comprising transmitting said modulated carrier including generating the modulation for said carrier independently of said local clock.

20. A radio ranging receiver as recited in claim 4, in combination with a radio transmitter, said transmitter comprising:
means for transmitting said modulated radio signal including means for generating the modulation for said radio signal independently of the local generated modulation signal of said receiver.

21. The improvement in a radio navigation receiver as recited in claim 1, in combination with a radio transmitter, said transmitter comprising:
means for transmitting said modulated radio signal including means for generating the modulation for said radio signal independently of the local generated modulation signal of said receiver.

* * * * *